(12) United States Patent
Honda et al.

(10) Patent No.: US 7,238,431 B2
(45) Date of Patent: Jul. 3, 2007

(54) HIGHLY CORROSION-RESISTANT HOT DIP PLATED STEEL MATERIAL EXCELLENT IN SURFACE SMOOTHNESS

(75) Inventors: Kazuhiko Honda, Kimitsu (JP); Akira Takahashi, Kimitsu (JP); Yoshihiro Suemune, Kimitsu (JP); Hidetoshi Hatanaka, Kimitsu (JP); Tsuyoshi Miyake, Kimitsu (JP); Wataru Yamada, Kimitsu (JP); Koki Tanaka, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/507,148

(22) PCT Filed: Jan. 9, 2003

(86) PCT No.: PCT/JP03/00129
§ 371 (c)(1),
(2), (4) Date: Sep. 8, 2004

(87) PCT Pub. No.: WO03/076679
PCT Pub. Date: Sep. 18, 2003

(65) Prior Publication Data
US 2005/0123786 A1 Jun. 9, 2005

(30) Foreign Application Priority Data
Mar. 8, 2002 (JP) .................... 2002-064303
May 2, 2002 (JP) .................... 2002-130792

(51) Int. Cl.
*B32B 15/04* (2006.01)
*B32B 15/18* (2006.01)
*B32B 15/20* (2006.01)

(52) U.S. Cl. .............. 428/659; 428/653; 428/687
(58) Field of Classification Search ............ 428/653
See application file for complete search history.

(56) References Cited

U.S. PATENT DOCUMENTS 6,440,582 B1 * 8/2002 McDevitt et al. ........... 428/653
6,465,114 B1 * 10/2002 Honda et al. ............... 428/659

FOREIGN PATENT DOCUMENTS

| JP | 62142736 | 6/1987 |
| JP | 7316763 | 12/1995 |
| JP | 2000064061 | 2/2000 |
| JP | 2001348678 | 12/2001 |
| JP | 2002004022 | 1/2002 |
| WO | WO 01/27343 | * 4/2001 |

OTHER PUBLICATIONS

Office Action issued in the Korean Patent application dated Mar. 27, 2006.
English-language translation of the Korean Office Action issued in the Korean Patent application dated Mar. 27, 2006.
European Search Report for European Patent Application No. EP 01 98 6159 dated Jun. 23, 2004.

* cited by examiner

*Primary Examiner*—Michael E. Lavilla
(74) *Attorney, Agent, or Firm*—Dorsey & Whitney LLP

(57) ABSTRACT

The present invention provides a plated steel material, said plated steel material having a plated layer which contains Al of 4% or more in mass, excellent in surface smoothness even when a cooling rate is low. In the present invention: a plated layer which contains Al of 4% or more in mass and has an Al-type intermetallic compound in an Al phase or abutting on an Al phase is formed on the surface of a steel material; in particular, high corrosion-resistance is secured in various environments by using a plated layer containing Al of 4 to 20% and Mg of 1 to 10% in mass with the balance consisting of Zn and unavoidable impurities or a plated layer containing Al of 4 to 20%, Mg of 1 to 10% and Si of 0.001 to 2% in mass with the balance consisting of Zn and unavoidable impurities; said plated layer contains an intermetallic compound having a melting point of 600° C. or higher by 0.001 to 0.5% in mass; and a plated steel material having an excellent surface smoothness is obtained by using an Al-type intermetallic compound wherein at least one of the lattice constants is in the range from 3 to 5 Å.

12 Claims, 2 Drawing Sheets

HIGHLY CORROSION-RESISTANT HOT DIP PLATED STEEL MATERIAL EXCELLENT IN SURFACE SMOOTHNESS

CROSS REFERENCE TO RELATED APPLICATION(S)

This application is a national stage application of PCT Application No. PCT/JP03/00129 which was filed on Jan. 9, 2003 and published on Sep. 18, 2003 as International Publication No. WO 03/076679 (the "International Application"). This application claims priority from the International Application pursuant to 35 U.S.C. § 365. The present application also claims priority under 35 U.S.C. § 119 from Japanese Patent Application Nos. 2002-064303 and 2002-130792, filed Mar. 8, 2002 and May 2, 2002, respectively, the entire disclosures of which are incorporated herein by reference.

FIELD OF THE INVENTION

The present invention relates to a plated steel sheet and, in particular, to a steel material having a particular surface smoothness and being applicable to various applications such as steel sheets for home electric appliances, automobiles and building materials.

BACKGROUND INFORMATION

Among plated steel materials most commonly used as having a good corrosion resistance, there are galvanized-type and aluminum-plated-type steel sheets. Such plated steel sheets are used in various manufacturing industries including the fields of automobiles, home electric appliances and building materials. In addition to those, plated steel materials are used in various fields including plated steel wires and hot dip plating. In particular, steel materials to which Al-added plating is applied have a high corrosion resistance and, therefore, have been increasingly used in recent years.

To improve the corrosion resistance of such galvanized-type steel sheets, the use of Zn—Al—Mg—Si hot dip plated steel sheets has been described in Japanese Patent No. 3179446. Further, in Japanese Patent Publication No. 2000-064061, it was described that a painted steel sheet more excellent in corrosion resistance can be obtained by adding one or more elements of Ca, Be, Ti, Cu, Ni, Co, Cr and Mn to such a proposed Zn—Al—Mg—Si hot dip plated steel sheet.

Further, Japanese Patent Publication No. H5-125515 describes that, when Ti is added to a Zn—Al hot dip plated steel sheet with the aim of improving the corrosion resistance of a galvanized-type steel sheet, the steel sheet is excellent in resistance to black discoloration with age. Furthermore, Japanese Patent Publication No. 2001-295015 describes that a surface appearance is improved by adding Ti, B and Si to a Zn—Al—Mg hot dip plated steel sheet.

However, with the aforementioned and with other disclosed plated steel sheets, surface smoothness is likely insufficiently secured.

In the case of a Zn—Al binary alloy, the eutectic point thereof is 6% Al-94% Zn in mass and, when an Al concentration is higher than that, an Al phase crystallizes as a primary crystal. Meanwhile, in the case of an Al—Si binary alloy, the eutectic point thereof is 87.4% Al-12.6% Si in mass and, when an Al concentration is higher than that, an Al phase crystallizes as a primary crystal.

In the case of a Zn—Mg—Al ternary alloy, the ternary eutectic point thereof is 3% Mg-4% Al-93% Zn in mass and when an Al concentration is higher than this an Al phase crystallizes as a primary crystal. When a solidification speed of plating is sufficiently secured at the time of hot dip plating, the plating solidifies before an Al phase grows large and therefore surface smoothness does not deteriorate. In contrast, when a solidification speed of plating is low, the problem is that an Al phase grows large at first, causing ruggedness to form on a plated surface and, as a result, the surface smoothness deteriorates.

Nevertheless, the technology described in the aforementioned Japanese Patent No. 3179446 generally does not take the problem of the deterioration of surface smoothness into consideration. Further, though the technology described in the aforementioned Japanese Patent Publication No. 2000-064061 may employ the addition of one or more elements of Ca, Be, Ti, Cu, Ni, Co, Cr and Mn with the aim of improving post-painting corrosion resistance, the technology neither takes the problem of the deterioration of surface smoothness into consideration, nor refers to an intermetallic compound. The technology described in the aforementioned Japanese Patent Publication No. H5-125515 does not take the problem of the deterioration of surface smoothness into consideration. Furthermore, though the technology described in the aforementioned Japanese Patent Publication No. 2001-295015 employs the addition of Ti and B with the aim of suppressing the formation and growth of a $Zn_{11}Mg_2$ phase that deteriorates surface appearance, the technology neither takes the problem of the deterioration of surface smoothness into consideration nor refers to an intermetallic compound.

SUMMARY OF THE INVENTION

The present invention has been addressed in the light of the above problems and the object thereof is to provide a plated steel material excellent in surface smoothness even in the case of a high Al concentration exceeding 4% in mass.

According to one exemplary embodiment of the present invention, a highly corrosion-resistant hot dip plated steel material excellent in surface smoothness is provided. For example, on the surface of the steel material, a plated layer is provided which contains Al of 4% or more in mass and has an Al-type intermetallic compound in an Al phase. According to another exemplary embodiment of the present invention, the plated layer may contains Al of 4% or more in mass and has an Al-type intermetallic compound abutting on an Al phase.

The plated layer may contain Al of 4 to 20% and Mg of 1 to 10% in mass with the balance consisting of Zn and unavoidable impurities. Alternatively or in addition, the plated layer may contain Al of 4 to 20%, Mg of 1 to 10% and Si of 0.001 to 2% in mass with the balance consisting of Zn and unavoidable impurities. On the surface of the steel material, a plated layer containing an intermetallic compound may be provided having a melting point of 600° C. or higher by 0.001 to 0.5% in mass.

According to still exemplary embodiment of the present invention, a highly corrosion-resistant hot dip plated steel material excellent in surface smoothness may be provided. For example, at least one of the lattice constants of the intermetallic compound may be in the range from 3 to 5 Å. The intermetallic compound can be one or more of an Ni—Al-type intermetallic compound, a Ti—Al-type intermetallic compound, a Zr—Al-type intermetallic compound and an Sr—Al-type intermetallic compound. The intermetallic compound can also be one or more of $TiAl_3$, $NiAl_3$, $Co_2Al_9$, $Co_4Al_{13}$, $CrAl_4$, $CrAl_7$, $Cr_2Al_{11}$, $Mn_4Al_{11}$, $MnAl_6$, $Al_{11}Ce_3$, $CeZn_2Al_2$, $Al_9Ir_2$, $Al_{11}La_3$, $Al_{12}Mo$, $NbAl_3$, $Al_2Se_3$, $TaAl_3$, $ZrAl_3$, $Zr_2ZnAl_3$, $Al_2Ca$, $Ti_7Al_6Si_{12}$, $FeNiAl_9$, $Fe_3NiAl_{10}$, $TiAl_2$, $TiAl$, $Ni_2Al_3$, $NiAl$ and $SrAl_4$. The Ti—Al-type intermetallic compound may be $Ti(Al_{1-X}Si_X)_3$.

All cited references are hereby incorporated herein by reference in their entireties.

DETAILED DESCRIPTION

Figure 1A:
FIG. 1(a) is a micrograph (magnification: 3,500) of a plated layer of a plated steel material which includes an intermetallic compound existing in an Al phase.

The hot dip plated steel materials according to the present invention can include: a plated steel material characterized by having on the surface thereof a plated layer which contains Al of 4% or more in mass and has an Al-type intermetallic compound in an Al phase. A plated steel material can also be includes which is characterized by having on the surface thereof a plated layer which contains Al of 4% or more in mass and has an Al-type intermetallic compound abutting on an Al phase.

According to one exemplary embodiment of the present invention, hot dip plating can mean a plating which uses metal prepared: by adding Al and, if necessary, further one or both of Si and Mg to a molten Zn bath; or by adding Si and, if necessary, additional one or both of Zn and Mg to a molten Al bath.

In a plating bath, besides the above components, Fe, Sb, Pb, Sn and unavoidable impurities may be contained individually or in combination by 0.5% or less in mass. Further, even when Ca, Be, Cu, Co, Mn, P, B, Bi and the third group elements are contained by 0.5% or less in mass in total, the effect of the present invention is not hindered and rather, in some favorable cases, corrosion resistance is further improved depending on the addition amount.

The reason why an Al content is limited to 4% or more in mass in the present invention is that, if an Al content is less than 4% in mass, the effect of improving corrosion resistance is insufficient. Meanwhile, when an Al content is less than 4% in mass, an Al phase does not crystallize as a primary crystal and therefore the problem of the deterioration of smoothness does not arises. The upper limit of an Al content is not particularly regulated. However, it is desirable that an Al content is 95% or less in mass in order to avoid too high a plating bath temperature.

According to an exemplary embodiment of the present invention, an Al phase may be the phase that looks like an island or a dendrite having a clear boundary in a plated layer and the phase corresponds to, for example, an "Al phase" (an Al solid solution that contains Zn in the state of a solid solution) at a high temperature in an Al—Zn binary phase equilibrium diagram. In such an Al phase at a high temperature, the amount of dissolved Zn varies in accordance with the concentration of Al in a plating bath. An Al phase at a high temperature usually separates into a fine Al phase and a fine Zn phase at an ordinary temperature and it is reasonably estimated that the island shape observed at an ordinary temperature is the residue of the Al phase at a high temperature. The phase that derives from such an Al phase (called an Al primary crystal) at a high temperature and retains the shape of the Al phase is called an Al phase in the present invention.

In the case of an Al phase of an Al—Si binary, Al—Zn—Si ternary, Al—Zn—Mg ternary, Al—Mg—Si ternary or Al—Zn—Mg—Si quaternary alloy, the amount of dissolved elements and also the shape of the phase at an ordinary temperature vary in accordance with the variation of the concentration in the alloy in a plating bath. However, in any of the cases, the Al phase retains the shape derived from an Al primary crystal, is clearly identified under microscopic observation, and thus is called an Al phase in the present invention.

In this manner, plating of a poor surface smoothness represents a state wherein ruggedness is formed on the surface of a plated layer at the intervals of several tens micrometers to several millimeters and can sufficiently be observed visually. When the cross section of a plated layer is observed with an optical microscope, the plated layer is classified into the portions of thick plated layers and thin plated layers and, in some extreme cases, the thickness of a thin portion is less than half that of a thick portion. The smoothness can be evaluated by measuring the roughness in the wavelength range of 50 μm or more.

The reason why the position of an Al-type intermetallic compound in a plating layer may be limited to a position in an Al phase or a position abutting on an Al phase in the present invention is that, with an intermetallic compound existing at a position other than the above, surface smoothness would not likely be improved.

The reason why an Al-type intermetallic compound existing in an Al phase or abutting on an Al phase improves surface smoothness is presumably that the inoculation effect, that an Al-type intermetallic compound provides, acts as the crystallization nucleus of an Al phase causes many Al phases to crystallize even at a low cooling rate and the solidification of a plated layer to become uniform.

Figure 1B:
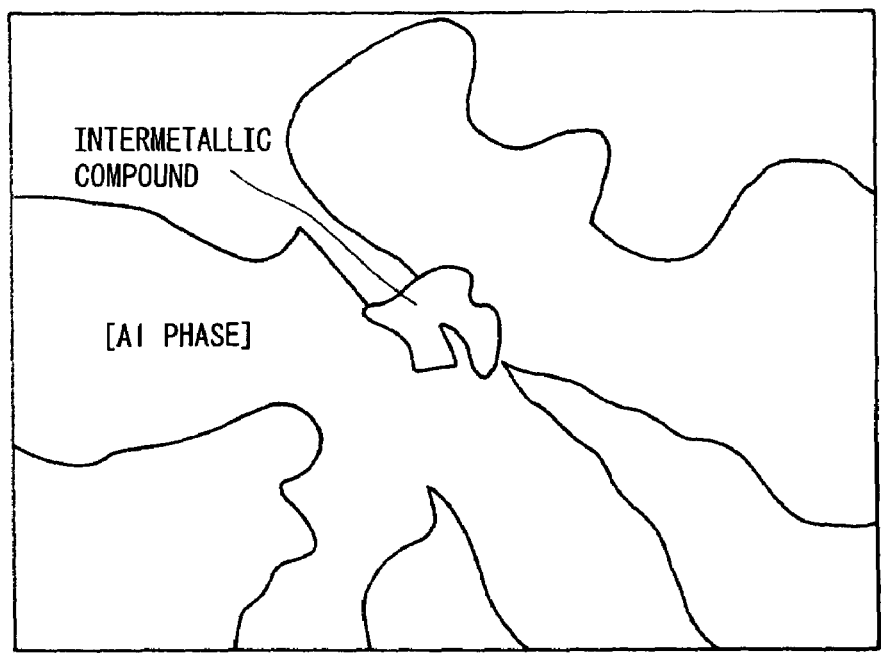
FIG. 1(b) is an illustration of an exemplary distribution state of each structure in the microphotograph of the plated layer of the plated steel material of FIG. 1(a).

Based on the investigation of Al phases in many plated layers, intermetallic compounds several micrometers in size were observed in most of the Al phases or at portions abutting on the Al phases. An example of an intermetallic compound existing in an Al phase is shown in FIG. 1. FIG. 1(a) shows a microphotograph (magnification: 3,500) of the plated layer of a plated steel material according to an exemplary embodiment of the present invention. FIG. 1(b) shows an illustration of an exemplary distribution state of each structure in the microphotograph of FIG. 1(a). As can be seen and understood from FIGS. 1(a) and 1(b), each structure can clearly be identified by a microphotograph of the plated layer of a plated steel material according to the present invention.

The size of an intermetallic compound is not particularly limited in the exemplary embodiment of the present invention. For example, the sizes of the intermetallic compounds may be 10 μm or smaller. The percentage of Al phases in which intermetallic compounds exist is not particularly limited either. It is desirable that the rate of Al phases wherein intermetallic compounds exist exceeds 10% of all Al phases.

Plated steel materials having a highly corrosion-resistant particularly in various environments among those according to another exemplary embodiment of the present invention include a plated steel material characterized by having on the surface thereof a plated layer containing Al of 4 to 20% and Mg of 1 to 10% in mass with the balance consisting of Zn and unavoidable impurities or a plated layer containing Al of 4 to 20%, Mg of 1 to 10% and Si of 0.001 to 2% in mass with the balance consisting of Zn and unavoidable impurities.

Some of the reasons why an Al content is limited to 4 to 20% in mass are that, if it is less than 4% in mass, the effect of improving corrosion resistance is insufficient, that, within that range, the problem of the deterioration of smoothness caused by the lack of the crystallization of an Al phase as a primary crystal is avoided, and that, if it exceeds 20% in mass, the effect of improving corrosion resistance is saturated.

Some of the reasons why an Mg content is limited to 1 to 10% in mass is that, if it is less than 1% in mass, the effect of improving corrosion resistance is insufficient and, if it exceeds 10% in mass, a plated layer embrittles and thus adhesiveness deteriorates.

Si has the effect of suppressing the growth of an Fe—Al alloy layer and improving plating adhesiveness. For that reason, it is effective to add Si when an Fe—Al alloy layer is likely to grow as in the case of a high plating bath temperature or a large Al content. Some of the reasons why an Si content is limited to 0.001 to 2% in mass is that, if it is less than 0.001% in mass, the effect of suppressing the growth of an Fe—Al alloy layer in a plated layer is insufficient and, if it exceeds 2% in mass, the effect of improving adhesiveness is saturated.

According to an exemplary embodiment of the present invention, a Zn—Mg—Al-type plated layer forms a metallographic structure containing one or more of a [Zn phase], an [Al phase] and a [$Zn_2Mg$ phase] in the substrate of an [Al/Zn/$Zn_2Mg$ ternary eutectic structure]. Then, a Zn—Mg—Al—Si-type plated layer forms a metallographic structure containing one or more of a [Zn phase], an [Al phase], a [$Zn_2Mg$ phase], an [Si phase] and an [$Mg_2Si$ phase] in the substrate of an [Al/Zn/$Zn_2Mg$ ternary eutectic structure].

The [Al/Zn/$Zn_2Mg$ ternary eutectic structure] can be the ternary eutectic structure comprising an Al phase, a Zn phase and an intermetallic compound $Zn_2Mg$ phase. The Al phase which composes the ternary eutectic structure corresponds to, for example, an [Al" phase] (an Al solid solution that contains Zn in the state of a solid solution and includes a small amount of Mg) at a high temperature in an Al—Zn—Mg ternary phase equilibrium diagram. Such an Al" phase at a high temperature usually appears in the state of separating into a fine Al phase and a fine Zn phase at an ordinary temperature. Further, the Zn phase in the ternary eutectic structure contains a small amount of Al in the state of a solid solution and, in some cases, is a Zn solid solution wherein a small amount of Mg is dissolved further. The $Zn_2Mg$ phase in the ternary eutectic structure is an intermetallic compound phase existing in the vicinity of the point indicated at about 84% in mass of Zn in the Zn—Mg binary phase equilibrium diagram. As long as it is observed in the phase diagram, it is estimated that Si does not dissolve in each phase or, even if it dissolves, the dissolved amount is very small. However, since the very small dissolved amount cannot clearly be identified with an ordinary analysis, the ternary eutectic structure composed of the three phases is expressed by the term [Al/Zn/$Zn_2Mg$ ternary eutectic structure] according to the exemplary embodiment of the present invention.

Further, an [Al phase] can be the phase that looks like an island having a clear boundary in the substrate of the aforementioned ternary eutectic structure and the phase corresponds to, for example, an [Al" phase] (an Al solid solution that contains Zn in the state of a solid solution and includes a small amount of Mg) at a high temperature in an Al—Zn—Mg ternary phase equilibrium diagram. In an Al" phase at a high temperature, the amounts of dissolved Zn and Mg vary in accordance with the concentrations of Al and Mg in a plating bath. Such an Al" phase at a high temperature usually separates into a fine Al phase and a fine Zn phase at an ordinary temperature and it is reasonably estimated that the island shape observed at an ordinary temperature is the residue of the Al" phase at a high temperature. As long as it is observed in the phase diagram, it is estimated that Si does not dissolve in the phase or, even if it dissolves, the dissolved amount is very small. However, as the very small dissolved amount cannot clearly be identified with an ordinary analysis, the phase that derives from the Al" phase (called an Al primary crystal) at a high temperature and retains the shape of the Al" phase is called an [Al phase] in the present invention. In this case, the [Al phase] can clearly be distinguished from the Al phase composing the aforementioned ternary eutectic structure under microscopic observation.

Furthermore, a [Zn phase] can be the phase that appears as an island having a clear boundary in the substrate of the aforementioned ternary eutectic structure and, in some actual cases, a small amount of Al and further a small amount of Mg may dissolve in the phase. As long as it is observed in the phase diagram, it is estimated that Si does not dissolve in the phase or, even if it dissolves, the dissolved amount is very small. In this case, the [Zn phase] can clearly be distinguished from the Zn phase composing the aforementioned ternary eutectic structure under microscopic observation.

Yet further, a [$Zn_2Mg$ phase] can be the phase that looks like an island having a clear boundary in the substrate of the aforementioned ternary eutectic structure and, in some actual cases, a small amount of Al may dissolve in the phase. As long as it is observed in the phase diagram, it is estimated that Si does not dissolve in the phase or, even if it dissolves, the dissolved amount is very small. In this case, the [$Zn_2Mg$ phase] can clearly be distinguished from the $Zn_2Mg$ phase composing the aforementioned ternary eutectic structure under microscopic observation.

Still further, an [Si phase] may be the phase that looks like an island having a clear boundary in the solidification structure of a plated layer, for example, the phase that corresponds to primary crystal Si in a Zn—Si binary phase equilibrium diagram. In some actual cases, a small amount of Al may dissolve in the phase and thus, as long as it is observed in the phase diagram, it is estimated that Zn and Mg do not dissolve or, even if they dissolve, their dissolved amounts are very small. In this case, the [Si phase] can clearly be identified in the plated layer under microscopic observation.

In addition, an [$Mg_2Si$ phase] can be the phase that looks like an island having a clear boundary in the solidification structure of a plated layer, for example, the phase that corresponds to primary crystal $Mg_2Si$ in an Al—Mg—Si ternary phase equilibrium diagram. As long as it is observed in the phase diagram, it is estimated that Zn and Al do not dissolve or, even if they dissolve, their dissolved amounts are very small. In this case, the [Mg$_2$Si phase] can clearly be identified in the plated layer under microscopic observation.

Figure 2A:
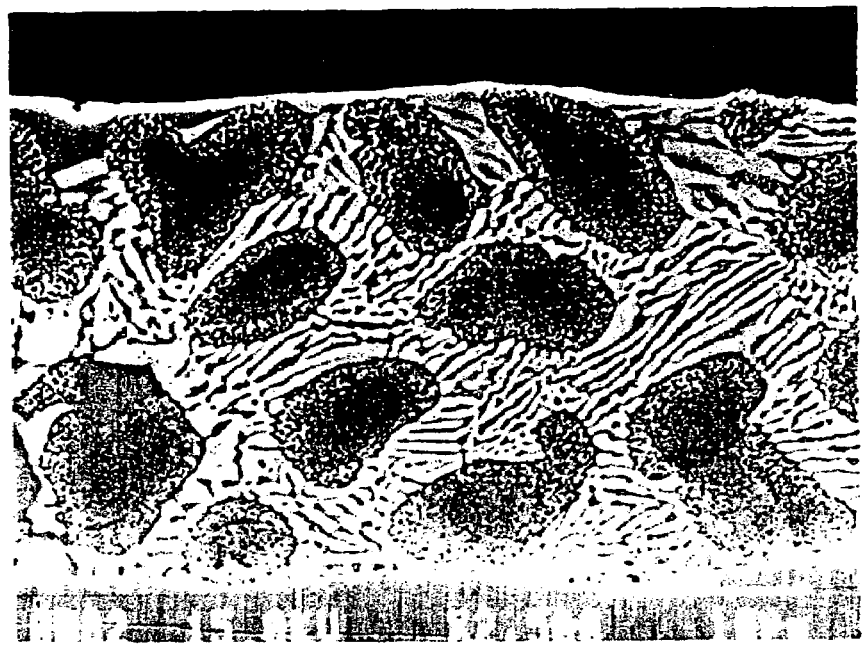
FIG. 2(a) is a microphotograph (magnification: 2,500) of the plated layer of a plated steel material according to the present invention which includes an example of the solidification structure of the plated layer.
Figure 2B:
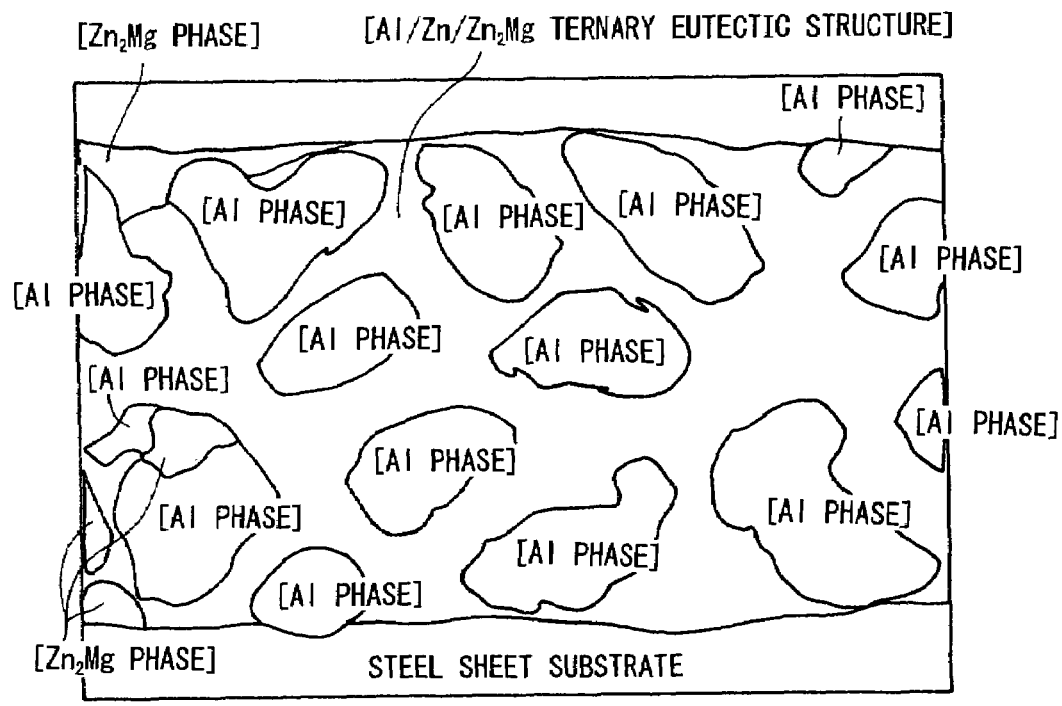
FIG. 2(b) is an illustration of the distribution state of each structure in the microphotograph of the plated layer of the plated steel material according to the present invention.

An example of the solidification structure of the aforementioned plated layer is shown in FIGS. 2(a) and 2(b). FIG. 2(a) shows an exemplary microphotograph (magnification: 2,500) of the plated layer of a plated steel material according to another exemplary embodiment of the present invention. FIG. 2(b) shows an illustration of the distribution state of each structure in the microphotograph of FIG. 2(a). As can be understood from FIGS. 1(a) and 1(b), each structure can clearly be identified by a microphotograph of the plated layer of a plated steel material according to the exemplary embodiment of the present invention.

According to the present invention, it may be desirable that the melting point of an intermetallic compound contained in a plated layer is 600° C. or higher. One of the reasons why surface smoothness improves by containing an intermetallic compound having a melting point of 600° C. or higher is presumably that an intermetallic compound of a high melting point acts as a nucleus of a crystal, [Al phase] crystals crystallize in quantity and, as a result the growth of [Al phase] crystals is suppressed.

One of the reasons why the content of an intermetallic compound having a melting point of 600° C. or higher is limited to 0.001 to 0.5% in mass is that, if it is less than 0.001% in mass, the effect of improving surface smoothness is insufficient and, if it exceeds 0.5% in mass, an intermetallic compound concentrates on the surface of a plated layer and poor appearance occurs.

A method of adding an intermetallic compound is not particularly regulated and a method of mixing fine powder of an intermtallic compound in a bath, a method of melting an intermetallic compound in a bath or the like may be applied. In particular, a bath prepared by melting very small amounts of Ti, Ni, Co, Cr, Mn, Ce, Ir, La, Mo, Nb, Se, Ta, Zr, Ca, Sr, etc. in a Zn—Al alloy liquid at a temperature of 400° C. to 600° C. and adding the elements which crystallize as an intermetallic compound during solidification before an Al phase crystallizes is very effective in improving surface smoothness.

In the case of a plated layer formed by hot dip plating in a bath to which elements having aforementioned features are added, intermetallic compounds composed one or more of TiAl$_3$, NiAl$_3$, Co$_2$Al$_9$, Co$_4$Al$_{13}$, CrAl$_4$, CrAl$_7$, Cr$_2$Al$_{11}$, Mn$_4$Al$_{11}$, MnAl$_6$, Al$_{11}$Ce$_3$, CeZn$_2$Al$_2$, Al$_9$Ir$_2$, Al$_{11}$La$_3$, Al$_{12}$Mo, NbAl$_3$, Al$_2$Se$_3$, TaAl$_3$, ZrAl$_3$, Zr$_2$ZnAl$_3$, Al$_2$Ca, Ti$_7$Al$_5$Si$_{12}$, FeNiAl$_9$, Fe$_3$NiAl$_{10}$, TiAl$_2$, TiAl, Ni$_2$Al$_3$, NiAl and SrAl$_4$ are contained in or beside an Al phase.

Such intermetallic compounds may also appear as islands having clear boundaries in the solidification structure of a plated layer. When an intermetallic compound is crystallized from an Si added bath, sometimes a small amount of Si may dissolve in the intermetallic compound or a part of Al contained in the intermetallic compound may be replaced with Si.

In the case of an intermetallic compound having a lattice constant close to 4.05 Å, which is the lattice constant of Al in particular, an inoculation effect is likely to be obtained and, for that reason, it may be desirable that at least one of the lattice constants of intermetallic compounds is in the range from 3 to 5 Å.

As Al-type intermetallic compounds having the aforementioned features, an Ni—Al-type intermetallic compound, a Ti—Al-type intermetallic compound, a Zr—Al-type intermetallic compound, an Sr—Al-type intermetallic compound and the like, concretely NiAl$_3$, TiAl$_3$, Ti(Al$_{1-x}$Si$_x$)$_3$, ZrAl$_3$, SrAl$_4$, etc., can be used.

As substrate steel materials in the present invention, not only steel sheets but also various steel materials including wire rods, shapes, sections, steel pipes, etc. can be used. As steel sheets, both hot-rolled and cold-rolled steel sheets can be used and, with regard to steel types too, various types of steels can be applied, such as Al-killed steels, ultra-low carbon steel sheets to which Ti, Nb, etc. are added, high-strength steels produced by adding strengthening elements such as P, Si, Mn, etc. to the above steels, and stainless steels.

A method for producing a product according to an exemplary embodiment of the present invention is not particularly regulated and various methods such as continuous plating method for steel sheets, hot dip plating method for steel materials and wire rods can be applied. In the case of applying Ni pre-plating as the lower layer, a commonly adopted pre-plating method may be applied. A product produced according to the present invention can secure a plating layer having a good surface smoothness even when a cooling rate is low, and therefore the effect of the exemplary embodiment of the present invention is conspicuous in hot dip plating and hot dip plating of a material having a large thickness wherein a large cooling rate is hard to secure.

Though the deposition amount of plating is not particularly regulated, a desirable amount is 10 g/m$^2$ or more from the viewpoint of corrosion resistance and 350 g/m$^2$ or less from the viewpoint of workability.

Exemplary embodiments of the present invention are further explained below on the basis of Examples.

EXAMPLE 1

Cold-rolled steel sheets 2.0 mm in thickness were prepared, subjected to hot dip plating for three seconds at 400° C. to 700° C. in a plating bath wherein the amounts of added elements were changed and to N$_2$ wiping for adjusting the plated amount to 140 g/m$^2$, and then cooled at a cooling rate of 10° C./sec. or lower. The compositions of the plated layers of Zn-type plated steel sheets and Al-type plated steel sheets thus produced are shown in Tables 1 and 2, respectively.

Smoothness was evaluated by measuring the roughness in the wavelength range of 50 μm or more and regarding the roughness of 2 μm or less as acceptable.

The plated steel sheets thus produced were polished at an inclination of 10 degrees, an intermetallic compound was searched for by SEM, and the intermetallic compound was determined from the composition rate obtained by EPMA. In the evaluation, when an Al-type intermetallic compound was confirmed in or beside an Al phase, it was judged to be acceptable.

The evaluation results are shown in Tables 1 and 2. In the cases of Nos. 1, 6, 11, 16, 21, 26 and 31, an intermetallic compound was not contained in an Al phase and therefore smoothness was unacceptable. In all the other cases, good smoothness was obtained.

TABLE 1

| No. | Composition of hot dip galvanized layer (wt %) | | | Intermetallic compound | Lattice constant of compound (Å) | | | Intermetallic compound in Al phase | Roughness evaluation | Remarks |
|---|---|---|---|---|---|---|---|---|---|---|
| | Al | Mg | Si | | a | b | c | | | |
| 1 | 5 | | | — | | | | Unaccept. | Unaccept. | Comparable |
| 2 | 5 | | | TiAl$_3$ | 3.8537 | | 8.5839 | Accept. | Accept. | Invented |
| 3 | 5 | | | NiAl$_3$ | 6.598 | 7.352 | 4.802 | Accept. | Accept. | Invented |
| 4 | 5 | | | ZrAl$_3$ | 4.009 | | 17.281 | Accept. | Accept. | Invented |
| 5 | 5 | | | SrAl$_4$ | 4.46 | | 11.07 | Accept. | Accept. | Invented |
| 6 | 11 | 3 | | — | | | | Unaccept. | Unaccept. | Comparable |
| 7 | 11 | 3 | | TiAl$_3$ | 3.8537 | | 8.5839 | Accept. | Accept. | Invented |
| 8 | 11 | 3 | | NiAl$_3$ | 6.598 | 7.352 | 4.802 | Accept. | Accept. | Invented |
| 9 | 11 | 3 | | ZrAl$_3$ | 4.009 | | 17.281 | Accept. | Accept. | Invented |
| 10 | 11 | 3 | | SrAl$_4$ | 4.46 | | 11.07 | Accept. | Accept. | Invented |
| 11 | 11 | 3 | 0.05 | — | | | | Unaccept. | Unaccept. | Comparable |
| 12 | 11 | 3 | 0.05 | Ti(Al0.85Si0.15)$_3$ | 3.78 | | 8.538 | Accept. | Accept. | Invented |
| 13 | 11 | 3 | 0.05 | NiAl$_3$ | 6.598 | 7.352 | 4.802 | Accept. | Accept. | Invented |
| 14 | 11 | 3 | 0.05 | ZrAl$_3$ | 4.009 | | 17.281 | Accept. | Accept. | Invented |
| 15 | 11 | 3 | 0.05 | SrAl$_4$ | 4.46 | | 11.07 | Accept. | Accept. | Invented |
| 16 | 55 | | 1.5 | — | | | | Unaccept. | Unaccept. | Comparable |
| 17 | 55 | | 1.5 | Ti(Al0.85Si0.15)$_3$ | 3.78 | | 8.538 | Accept. | Accept. | Invented |
| 18 | 55 | | 1.5 | NiAl$_3$ | 6.598 | 7.352 | 4.802 | Accept. | Accept. | Invented |
| 19 | 55 | | 1.5 | ZrAl$_3$ | 4.009 | | 17.281 | Accept. | Accept. | Invented |
| 20 | 55 | | 1.5 | SrAl$_4$ | 4.46 | | 11.07 | Accept. | Accept. | Invented |
| 21 | 55 | 3 | 1.5 | — | | | | Unaccept. | Unaccept. | Comparable |
| 22 | 55 | 3 | 1.5 | Ti(Al0.85Si0.15)$_3$ | 3.78 | | 8.538 | Accept. | Accept. | Invented |
| 23 | 55 | 3 | 1.5 | NiAl$_3$ | 6.598 | 7.352 | 4.802 | Accept. | Accept. | Invented |
| 24 | 55 | 3 | 1.5 | ZrAl$_3$ | 4.009 | | 17.281 | Accept. | Accept. | Invented |
| 25 | 55 | 3 | 1.5 | SrAl$_4$ | 4.46 | | 11.07 | Accept. | Accept. | Invented |

TABLE 2

| No. | Composition of Al hot dip plated layer (wt %) | | | Intermetallic compound | Lattice constant of compound (Å) | | | Intermetallic compound in Al phase | Roughness evaluation | Remarks |
|---|---|---|---|---|---|---|---|---|---|---|
| | Al | Mg | Si | | a | b | c | | | |
| 26 | | | 10 | — | | | | Unaccept. | Unaccept. | Comparable |
| 27 | | | 10 | Ti(Al0.85Si0.15)$_3$ | 3.78 | | 8.538 | Accept. | Accept. | Invented |
| 28 | | | 10 | NiAl$_3$ | 6.598 | 7.352 | 4.802 | Accept. | Accept. | Invented |
| 29 | | | 10 | ZrAl$_3$ | 4.009 | | 17.281 | Accept. | Accept. | Invented |
| 30 | | | 10 | SrAl$_4$ | 4.46 | | 11.07 | Accept. | Accept. | Invented |
| 31 | | 6 | 10 | — | | | | Unaccept. | Unaccept. | Comparable |
| 32 | | 6 | 10 | Ti(Al0.85Si0.15)$_3$ | 3.78 | | 8.538 | Accept. | Accept. | Invented |
| 33 | | 6 | 10 | NiAl$_3$ | 6.598 | 7.352 | 4.802 | Accept. | Accept. | Invented |
| 34 | | 6 | 10 | ZrAl$_3$ | 4.009 | | 17.281 | Accept. | Accept. | Invented |
| 35 | | 6 | 10 | SrAl$_4$ | 4.46 | | 11.07 | Accept. | Accept. | Invented |

EXAMPLE 2

Cold-rolled steel sheets 2.0 mm in thickness were prepared, subjected to hot dip plating for three seconds at 400° C. to 600° C. in a Zn alloy plating bath wherein the amounts of added elements were changed and to N$_2$ wiping for adjusting the plated amount to 140 g/m$^2$, and then cooled at a cooling rate of 10° C./sec. or lower. The compositions of the plated layers of the plated steel sheets thus produced are shown in Table 3.

Smoothness was evaluated by measuring the roughness in the wavelength range of 50 μm or more and regarding the roughness of 2 μm or less as acceptable.

The evaluation results are shown in Table 3. In the cases of Nos. 1 and 23, an intermetallic compound was not contained in the plated layers and, therefore, the smoothness was unacceptable. In all the other cases, good smoothness was obtained.

TABLE 3

| No. | Composition of hot dip galvanized layer (mass %) | | | Intermetallic compound | Intermetallic compound | Roughness evaluation | Remarks |
|---|---|---|---|---|---|---|---|
| | Mg | Al | Si | | | | |
| 1 | 3 | 11 | | | — | Unaccept. | Comparable |
| 2 | 3 | 11 | 0.1 | | TiAl$_3$ | Accept. | Invented |
| 3 | 3 | 11 | 0.1 | | NiAl$_3$ | Accept. | Invented |
| 4 | 3 | 11 | 0.1 | | Co$_2$Al$_9$ | Accept. | Invented |
| 5 | 3 | 11 | 0.1 | | CrAl$_7$ | Accept. | Invented |
| 6 | 3 | 11 | 0.1 | | MnAl$_6$ | Accept. | Invented |
| 7 | 3 | 11 | 0.1 | | CeZn$_2$Al$_2$ | Accept. | Invented |
| 8 | 3 | 11 | 0.1 | | Al$_9$Ir$_2$ | Accept. | Invented |
| 9 | 3 | 11 | 0.1 | | Al$_{11}$La$_3$ | Accept. | Invented |
| 10 | 3 | 11 | 0.1 | | Al$_{12}$Mo | Accept. | Invented |
| 11 | 3 | 11 | 0.1 | | NbAl$_3$ | Accept. | Invented |

TABLE 3-continued

Composition of hot dip galvanized layer (mass %)

| No. | Mg | Al | Si | Intermetallic compound | Intermetallic compound | Roughness evaluation | Remarks |
|---|---|---|---|---|---|---|---|
| 12 | 3 | 11 | | 0.1 | Al$_2$Se$_3$ | Accept. | Invented |
| 13 | 3 | 11 | | 0.1 | TaAl$_3$ | Accept. | Invented |
| 14 | 3 | 11 | | 0.1 | Zr$_2$ZnAl$_3$ | Accept. | Invented |
| 15 | 3 | 11 | | 0.1 | Al$_2$Ca | Accept. | Invented |
| 16 | 3 | 11 | | 0.1 | Ti$_7$Al$_5$Si$_{12}$ | Accept. | Invented |
| 17 | 3 | 11 | | 0.1 | FeNiAl$_9$ | Accept. | Invented |
| 18 | 3 | 11 | | 0.1 | Fe$_3$NiAl$_{10}$ | Accept. | Invented |
| 19 | 3 | 11 | | 0.1 | TiAl$_2$ | Accept. | Invented |
| 20 | 3 | 11 | | 0.1 | TiAl | Accept. | Invented |
| 21 | 3 | 11 | | 0.1 | Ni$_2$Al$_3$ | Accept. | Invented |
| 22 | 3 | 11 | | 0.1 | NiAl | Accept. | Invented |
| 23 | 3 | 11 | 0.05 | | — | Unaccept. | Comparable |
| 24 | 3 | 11 | 0.05 | 0.1 | TiAl$_3$ | Accept. | Invented |
| 25 | 3 | 11 | 0.05 | 0.1 | NiAl$_3$ | Accept. | Invented |
| 26 | 3 | 11 | 0.05 | 0.1 | Co$_2$Al$_9$ | Accept. | Invented |
| 27 | 3 | 11 | 0.05 | 0.1 | CrAl$_7$ | Accept. | Invented |
| 28 | 3 | 11 | 0.05 | 0.1 | MnAl$_6$ | Accept. | Invented |
| 29 | 3 | 11 | 0.05 | 0.1 | CeZn$_2$Al$_2$ | Accept. | Invented |
| 30 | 3 | 11 | 0.05 | 0.1 | Al$_9$Ir$_2$ | Accept. | Invented |
| 31 | 3 | 11 | 0.05 | 0.1 | Al$_{11}$La$_3$ | Accept. | Invented |
| 32 | 3 | 11 | 0.05 | 0.1 | Al$_{12}$Mo | Accept. | Invented |
| 33 | 3 | 11 | 0.05 | 0.1 | NbAl$_3$ | Accept. | Invented |
| 34 | 3 | 11 | 0.05 | 0.1 | Al$_2$Se$_3$ | Accept. | Invented |
| 35 | 3 | 11 | 0.05 | 0.1 | TaAl$_3$ | Accept. | Invented |
| 36 | 3 | 11 | 0.05 | 0.1 | Zr$_2$ZnAl$_3$ | Accept. | Invented |
| 37 | 3 | 11 | 0.05 | 0.1 | Al$_2$Ca | Accept. | Invented |
| 38 | 3 | 11 | 0.05 | 0.1 | Ti$_7$Al$_5$Si$_{12}$ | Accept. | Invented |
| 39 | 3 | 11 | 0.05 | 0.1 | FeNiAl$_9$ | Accept. | Invented |
| 40 | 3 | 11 | 0.05 | 0.1 | Fe$_3$NiAl$_{10}$ | Accept. | Invented |
| 41 | 3 | 11 | 0.05 | 0.1 | TiAl$_2$ | Accept. | Invented |
| 42 | 3 | 11 | 0.05 | 0.1 | TiAl | Accept. | Invented |
| 43 | 3 | 11 | 0.05 | 0.1 | Ni$_2$Al$_3$ | Accept. | Invented |
| 44 | 3 | 11 | 0.05 | 0.1 | NiAl | Accept. | Invented |

INDUSTRIAL APPLICABILITY

The exemplary embodiments of the present invention makes it possible to produce a plated steel sheet excellent in surface smoothness without the formation of ruggedness on the surface even when a solidification speed of plating is low and to provide a very excellent effect industrially.

The invention claimed is:

1. A corrosion-resistant hot dip plated steel material having a particular surface smoothness, comprising:
   at least one section having a surface; and
   a plated layer provided on the surface, the plated layer containing Al of about 4% to 20% in mass and Mg of about 1% to 10% in mass, and comprising an Al phase and an Al-type intermetallic compound, with the balance of the plated layer in mass consisting of Zn and unavoidable impurities, wherein the intermetallic compound has a melting point of at least 600° C. and lattice constants in the range of about 3 Å to 5 Å, and wherein the intermetallic compound comprises about 0.001% to 0.5% by mass of the plated layer.

2. The steel material according to claim 1, wherein the plated layer contains Si of about 0.001% to 2% in mass.

3. The steel material according to claim 1, wherein the intermetallic compound is at least one of an Ni—Al-type intermetallic compound, a Ti—Al-type intermetallic compound, a Zr—Al-type intermetallic compound, and an Sr—Al-type intermetallic compound.

4. The steel material according to claim 1, wherein the intermetallic compound is at least one of TiAl$_3$, NiAl$_3$, Co$_2$Al$_9$, Co$_4$Al$_{13}$, CrAl$_4$, CrAl$_7$, Cr$_2$Al$_{11}$, Mn$_4$Al$_{11}$, MnAl$_6$, Al$_{11}$Ce$_3$, CeZn$_2$Al$_2$, Al$_9$Ir$_2$, Al$_{11}$La$_3$, Al$_{12}$Mo, NbAl$_3$, Al$_2$Se$_3$, TaAl$_3$, ZrAl$_3$, Zr$_2$ZnAl$_3$, Al$_2$Ca, Ti$_7$Al$_6$Si$_{12}$, FeNiAl$_9$, Fe$_3$NiAl$_{10}$, TiAl$_2$, TiAl, Ni$_2$Al$_3$, NiAl, and SrAl$_4$.

5. The steel material according to claim 3, wherein the Ti—Al-type intermetallic compound is Ti(Al$_{1-x}$Si$_x$)$_3$.

6. A corrosion-resistant hot dip plated steel material having a particular surface smoothness, comprising:
   at least one section including a surface; and
   a plated layer provided on the surface, the plated layer including Al of about 4% to 20% in mass, Mg of about 1% to 10% in mass, with the balance of the plated layer in mass consisting of Zn and unavoidable impurities, and an Al-type intermetallic compound abutting on an Al phase.

7. The steel material according to claim 6, wherein the plated layer contains and Si of about 0.001% to 2% in mass.

8. The steel material according to claim 6, wherein the intermetallic compound has a melting point of at least 600° C. and about 0.001% to 0.5% in mass.

9. The steel material according to claim 6, wherein at least one of lattice constants of the intermetallic compound is in a range from about 3 Å to 5 Å.

10. The steel material according to claim 6, wherein the intermetallic compound is at least one of an Ni—Al-type intermetallic compound, a Ti—Al-type intermetallic compound, a Zr—Al-type intermetallic compound, and an Sr—Al-type intermetallic compound.

11. The steel material according to claim 6, wherein the intermetallic compound is at least one of TiAl$_3$, NiAl$_3$, Co$_2$Al$_9$, Co$_4$Al$_{13}$, CrAl$_4$, CrAl$_7$, Cr$_2$Al$_{11}$, MmAl$_{11}$, MnAl$_6$, Al$_{11}$Ce$_3$, CeZn$_2$Al$_2$, Al$_9$Ir$_2$, Al$_{11}$La$_3$, Al$_{12}$Mo, NbAl$_3$, Al$_2$Se$_3$, TaAl$_3$, ZrAl$_3$, Zr$_2$ZnAl$_3$, Al$_2$Ca, Ti$_7$Al$_6$Si12, FeNiAl$_9$, Fe$_3$NiAl$_{10}$, TiAl$_2$, TiAl, Ni$_2$Al$_3$, NiAl, and SrAl$_4$.

12. The steel material according to claim 10, wherein the Ti—Al-type intermetallic compound is Ti(Al$_{1-x}$Si$_x$)$_3$.

* * * * *